United States Patent
Watkins

(10) Patent No.: US 11,601,812 B2
(45) Date of Patent: Mar. 7, 2023

(54) SYSTEM AND METHOD FOR SMALL UNMANNED AERIAL SYSTEMS (SUAS) DEFENSE

(71) Applicant: THE JOHNS HOPKINS UNIVERSITY, Baltimore, MD (US)

(72) Inventor: Lanier Watkins, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 679 days.

(21) Appl. No.: 16/498,494

(22) PCT Filed: Mar. 1, 2018

(86) PCT No.: PCT/US2018/020448
§ 371 (c)(1),
(2) Date: Sep. 27, 2019

(87) PCT Pub. No.: WO2018/182915
PCT Pub. Date: Oct. 4, 2018

(65) Prior Publication Data
US 2020/0107198 A1 Apr. 2, 2020

Related U.S. Application Data

(60) Provisional application No. 62/478,154, filed on Mar. 29, 2017.

(51) Int. Cl.
*H04W 12/122* (2021.01)
*G06N 20/00* (2019.01)
(Continued)

(52) U.S. Cl.
CPC ............ *H04W 12/122* (2021.01); *G06N 5/04* (2013.01); *G06N 20/00* (2019.01); *H04W 12/106* (2021.01)

(58) Field of Classification Search
CPC .. H04W 12/122; H04W 12/106; G06N 20/00; G06N 5/04
(Continued)

(56) References Cited

U.S. PATENT DOCUMENTS 6,665,269 B1 * 12/2003 Schmitz ................ H04W 24/00
370/251
9,503,463 B2 * 11/2016 Karta ................... H04L 63/1416
(Continued)

FOREIGN PATENT DOCUMENTS

AU 2004298047 A1 * 6/2005 ............... H04K 3/65
CN 106446566 A * 2/2017 ........... G06K 9/6268
(Continued)

OTHER PUBLICATIONS

Valianti et al., "Multi-Agent Coordinated Close-in Jamming for Disabling a Rogue Drone," in IEEE Transactions on Mobile Computing, doi: 10.1109/TMC.2021.3062225, 2021, pp. 1-18. (Year: 2021).*
(Continued)

*Primary Examiner* — Peter C Shaw
(74) *Attorney, Agent, or Firm* — MH2 Technology Law Group LLP

(57) ABSTRACT

Provided is a method and a computer device for performing the method for defending a perimeter against a small unmanned aerial system (sUAS). The method includes detecting a presence of a wireless access point (WAP) associated with a sUAS; analyzing data packets intercepted from the WAP; determining the type of sUAS based on the data packets that were intercepted using a machine learning classifier; determining one or more exploits from a library of exploits to initiate against the sUAS based on the type of sUAS determined by the machine learning classifier; and transmitting the one or more exploits to the sUAS.

19 Claims, 2 Drawing Sheets

(51) Int. Cl.
*G06N 5/04* (2006.01)
*H04W 12/106* (2021.01)

(58) Field of Classification Search
USPC .......................................................... 726/23
See application file for complete search history.

(56) References Cited

U.S. PATENT DOCUMENTS

| | | | | |
|---|---|---|---|---|
| 2009/0322890 | A1* | 12/2009 | Bocking | H04N 1/00323 |
| | | | | 455/419 |
| 2015/0156211 | A1* | 6/2015 | Chi Tin | H04L 41/147 |
| | | | | 726/23 |
| 2015/0350914 | A1 | 12/2015 | Baxley et al. | |
| 2017/0069214 | A1 | 3/2017 | Dupray et al. | |
| 2017/0076616 | A1 | 3/2017 | Kanade et al. | |
| 2017/0094527 | A1* | 3/2017 | Shattil | H04K 3/45 |
| 2017/0192089 | A1* | 7/2017 | Parker | H04K 3/45 |
| 2017/0347058 | A1 | 11/2017 | Keegan et al. | |
| 2018/0257780 | A1* | 9/2018 | Sassinsky | F41H 9/04 |
| 2021/0343165 | A1* | 11/2021 | Baumgart | G01S 19/51 |

FOREIGN PATENT DOCUMENTS

| | | | | | |
|---|---|---|---|---|---|
| CN | 108353081 | A | * | 7/2018 | H04K 3/44 |
| CN | 108353081 | B | * | 1/2021 | H04K 3/44 |
| EP | 1895750 | A1 | * | 3/2008 | G06F 21/35 |
| GB | 2546438 | A | * | 7/2017 | B64C 39/024 |
| WO | WO-2014114099 | A1 | * | 7/2014 | H04W 12/12 |
| WO | 2016/141541 | A1 | | 9/2016 | |
| WO | WO-2017019595 | A1 | * | 2/2017 | B64C 39/024 |

OTHER PUBLICATIONS

Srivastava et al., "Estimation and Control for Autonomous UAV System to Neutralize unknown Aerial Maneuvering Target," 2021 Seventh Indian Control Conference (ICC), 2021, pp. 117-122, doi: 10.1109/ICC54714.2021.9703182. (Year: 2021).*

Kosolyudhthasarn et al., "Drone Detection and Identification by Using Packet Length Signature," 2018 15th International Joint Conference on Computer Science and Software Engineering (JCSSE), 2018, pp. 1-6, doi: 10.1109/JCSSE.2018.8457352. (Year: 2018).*

Wang et al., Counter-Unmanned Aircraft System(s) (C-UAS): State of the Art, Challenges and Future Trends, IEEE Aerospoace and Electronic Systems Magazine, 36.3, 2021, pp. 4-29. (Year: 2021).*

Park et al., "Survey on Anti-Drone Systems: Components, Designs, and Challenges," in IEEE Access, vol. 9, pp. 42635-42659, 2021, doi: 10.1109/ACCESS.2021.3065926. (Year: 2021).*

Sharma et al., "Drone Detection Mechanism using Radiocommunication Technology and Internet Protocol Address," 2019 International Conference on Smart Systems and Inventive Technology (ICSSIT), 2019, pp. 449-453, doi: 10.1109/ICSSIT46314.2019.8987972. (Year: 2019).*

Lee et al., "Drone Detection and Identification System using Artificial Intelligence," 2018 International Conference on Information and Communication Technology Convergence (ICTC), 2018, pp. 1131-1133, doi: 10.1109/ICTC.2018.8539442. (Year: 2018).*

Jayapalan et al., "Detection of Malicious UAV in Airspace," 2021 International Conference on Computer Communication and Informatics (ICCCI), 2021, pp. 1-4, doi: 10.1109/ICCCI50826.2021.9402413. (Year: 2021).*

Kratky et al., "The non-destructive methods of fight against UAVs," 2017 International Conference on Military Technologies (ICMT), 2017, pp. 690-694, doi: 10.1109/MILTECHS.2017.7988845. (Year: 2017).*

Kwon et al., "Empirical Analysis of MAVLink Protocol Vulnerability for Attacking Unmanned Aerial Vehicles," in IEEE Access, vol. 6, pp. 43203-43212, 2018, doi: 10.1109/ACCESS.2018.2863237. (Year: 2018).*

Xu et al., "Experimental Analysis of MAVLink Protocol Vulnerability on UAVs Security Experiment Platform," 2021 3rd International Conference on Industrial Artificial Intelligence (IAI), 2021, pp. 1-6, doi: 10.1109/IAI53119.2021.9619330. (Year: 2021).*

PCT International Search Report and Written Opinion dated May 15, 2018 in corresponding International Application No. PCT/US2018/020448.

Watkins, L., "Exploiting Multi-Vendor Vulnerabilities as Back-Doors to Counter the Threat of Rogue Small Unmanned Aerial Systems", 2018, Mobile IoT SSP, 6 pages.

International Preliminary Report on Patentability in corresponding International Application No. PCT/US2018/020448 dated Oct. 10, 2019.

* cited by examiner

SYSTEM AND METHOD FOR SMALL UNMANNED AERIAL SYSTEMS (SUAS) DEFENSE

CROSS-REFERENCE TO RELATED APPLICATIONS

This application is a national stage conversion under 35 U.S.C. § 371 of PCT Application No. PCT/US2018/020448 entitled "SYSTEM AND METHOD FOR SMALL UNMANNED AERIAL SYSTEMS (sUAS) DEFENSE" filed Mar. 1, 2018, which claims priority to U.S. Provisional No. 62/478,154 filed Mar. 29, 2017, the entire disclosures of which are hereby incorporated by reference in their entireties.

FIELD

The present disclosure relates to a system and method for Wi-Fi-based small unmanned aerial system (sUAS) defense.

BACKGROUND

Commercially-available and hobby-grade unmanned aerial systems (UASs) have become a popular pastime for many enthusiasts. There is a growing demand to see UASs employed for commercial purposes, but the realization of widespread commercial utilization has yet to be achieved due to complex regulatory environments and developments in sense-and-avoid technologies.

If these UASs continue to grow in popularity or are even adopted for widespread commercial use, then it is important to consider the implications for the safety and privacy of the population. Imagine a future where commercial UASs are employed by businesses in such a way that perhaps your next pepperoni pizza hovers outside your front door. Or, suppose that the United States Postal Service has grown weary of maintaining all of those delivery trucks, and your routine local mail is now airmail? These scenarios are not bound to our imagination, as companies such as Amazon, Google, and even NASA have experimented with commercial applications for the technology. With the use of these systems only becoming more common, safety concerns of these systems have yet been fully considered and mitigated.

Thus, a heretofore unaddressed need exists in the industry to address the aforementioned deficiencies and inadequacies.

SUMMARY

In accordance with examples of the present disclosure, a method for taking control of a small unmanned aerial system (sUAS) is provided. The method comprises detecting a presence of a wireless access point (WAP) associated with a sUAS; analyzing data packets intercepted from the WAP; determining that the sUAS is of an unknown type based on the data packets that were intercepted using a machine learning classifier; determining one or more exploits from a library of exploits to initiate against the sUAS based on the machine learning classifier; and transmitting the one or more exploits to the sUAS.

In accordance with examples of the present disclosure, a computer device is provided that comprises a hardware processor; a computer-readable medium configured to store instructions that when executed by the hardware processor cause the hardware processor to perform a method for taking control of a small unmanned aerial system (sUAS), the method comprising: detecting a presence of a wireless access point (WAP) associated with a sUAS; analyzing data packets intercepted from the WAP; determining that the sUAS is of an unknown type based on the data packets that were intercepted using a machine learning classifier; determining one or more exploits from a library of exploits to initiate against the sUAS based on the machine learning classifier; and transmitting the one or more exploits to the sUAS.

In accordance with examples of the present disclosure, a method and a computer device for performing the method for defending a perimeter against a small unmanned aerial system (sUAS) is provided. The method includes detecting a presence of a wireless access point (WAP) associated with a sUAS; analyzing data packets intercepted from the WAP; determining the type of sUAS based on the data packets that were intercepted using a machine learning classifier; determining one or more exploits from a library of exploits to initiate against the sUAS based on the type of sUAS determined by the machine learning classifier; and transmitting the one or more exploits to the sUAS.

In some examples, the machine learning classifier can include a random forest tree or a support vector machine.

In some examples, an exploit from the one or more exploits is configured to interrupt communication between the sUAS and a controller of the sUAS.

In some examples, an exploit from the one or more exploits is configured to cause the sUAS to crash.

In some examples, the one or more exploits include a non-intrusive exploit or an intrusive exploit.

In some examples, the one or more exploits is the intrusive exploit further comprises receiving a command from a user to initiate the intrusive exploit.

In some examples, the one or more exploits comprise a denial-of-service attack, a buffer-overflow attack, and an address resolution protocol (ARP) cache poisoning attack.

In some examples, the analyzing data packets intercepted from the WAP, further comprises extracting features from the data packets comprising a frame data, an IEEE 802.11 probe response data, and an IEEE 802.11 wireless LAN management frame data.

In some examples, the determining that the sUAS is of an unknown type is based on a whitelist of known sUAS types.

BRIEF DESCRIPTION OF THE DRAWINGS

The accompanying drawings, which are incorporated in and constitute a part of this specification, illustrate the present disclosure and together with the description, serve to explain the principles of the present disclosure.

DESCRIPTION

Reference will now be made in detail to exemplary implementations of the present disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations in which the present disclosure may be practiced. These implementations are described in sufficient detail to enable those skilled in the art to practice the present disclosure and it is to be understood that other implementations may be utilized and that changes may be made without departing from the scope of the present disclosure. The following description is, therefore, merely exemplary.

Generally speaking, examples of the present disclosure provide for the ability to search an airspace for a wireless access point (WAP) of sUAS and provide one or more commands to the wireless access point perform one or more actions, including immediately halting the sUAS by exploiting one or more cross vendor zero-day vulnerabilities and providing one or more options (such as hi-jacking and force landing) in a "man in the loop" scenario to launch one or more intrusive zero-day exploits.

Figure 1:
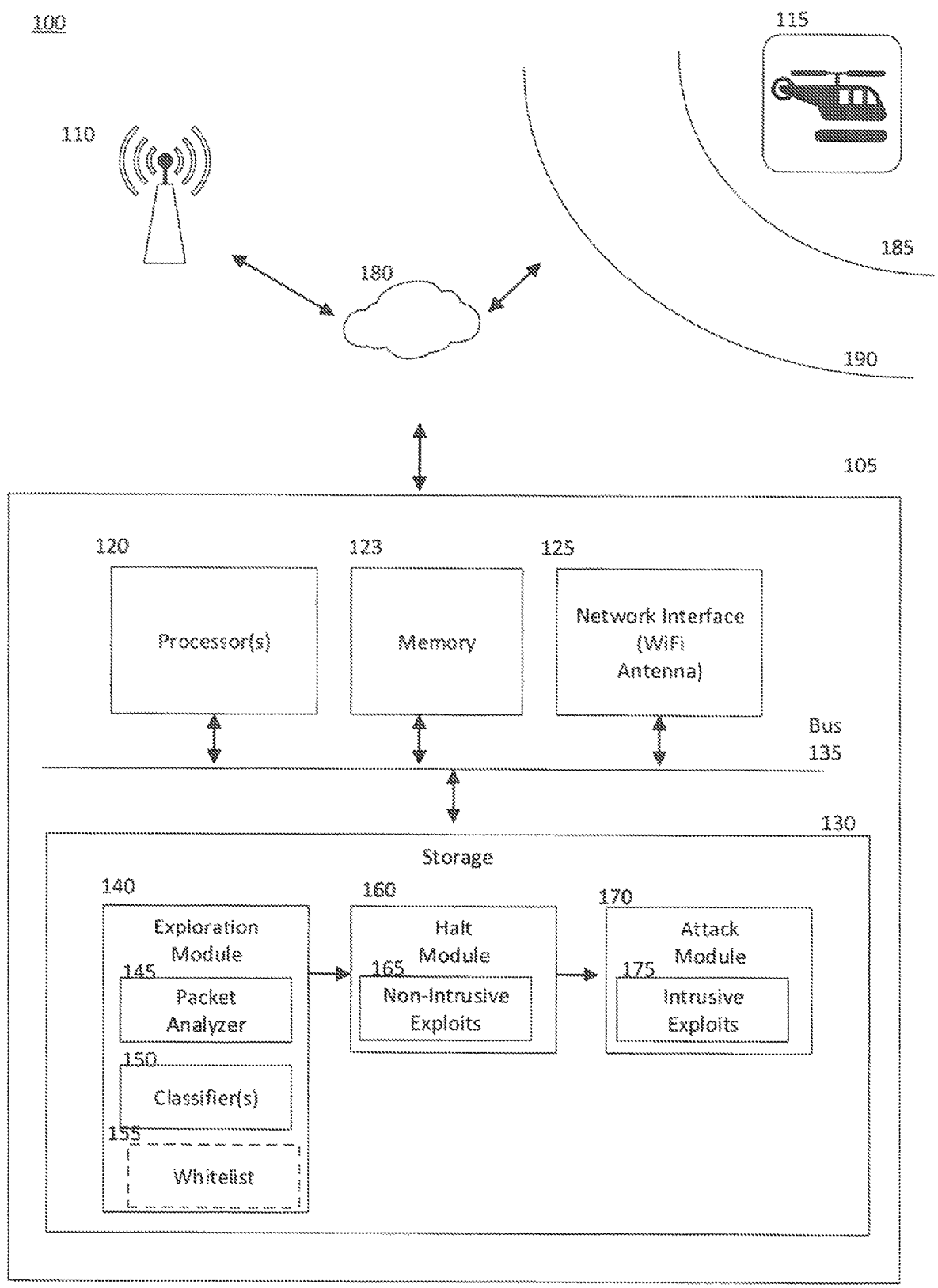
FIG. 1 shows an example system for searching and interacting with a sUAS 100, according to examples of the present disclosure.

FIG. 1 shows an example system for searching and interacting with a sUAS 100, according to examples of the present disclosure. The system 100 can be implemented on a computer device 105 and applicable software stored in a computer readable medium or storage 130 to perform one or more of the processes described herein. The computer 105 can include one or more processor(s) 120, a WiFi antenna 125 configured to communicate over a network 180 and configured to detect devices/system operating on a 2.4-5.4 GHz 802.11 spectrum, and a memory 123 electrically connected through a communication bus 135. The software can be logically divided into an exploration module 140, a halt module 160, and an attack module 170. While FIG. 1 illustrates various components contained in computer device 105, additional components can be added and existing components can be removed.

Computer device 105 can be any type of computer devices, such as desktops, laptops, servers, etc., or mobile devices, such as smart telephones, tablet computers, cellular telephones, personal digital assistants, etc. As illustrated in FIG. 1, the computer device 105 can include one or more processors 120 of varying core configurations and clock frequencies. Computer device 105 can also include one or more memory devices 123 that serve as a main memory during the operation of computer device 105. For example, during operation, a copy of the software that supports the various processing described above can be stored in one or more memory devices 123. Computer device 105 can also include one or more peripheral interfaces (not shown), such as keyboards, mice, touchpads, computer screens, touchscreens, etc., for enabling human interaction with and manipulation of computer device 105.

The computer device 105 can also include one or more network interfaces 125 for communicating via one or more networks, such as Ethernet adapters, wireless transceivers, i.e., WiFi antenna, or serial network components, for communicating over wired or wireless media using protocols. The computer device 105 can also include one or more storage device 130 of varying physical dimensions and storage capacities, such as flash drives, hard drives, random access memory, etc., for storing data, such as images, files, and program instructions for execution by one or more processors 120.

Additionally, computer device 105 can include one or more software programs that enable the functionality described above. One or more software programs, such as the exploration module 140, the halt module 160, and the attack module 170, can include instructions that cause the one or more processors 120 to perform the processes described herein. Copies of the one or more software programs can be stored in one or more memory devices 123 and/or on in one or more storage devices 130. Likewise, the data used by one or more software programs can be stored in one or more memory devices 123 and/or on in one or more storage devices 130.

In implementations, the computer device 105 can communicate with other devices via network 180. The other devices can be any types of devices as described above. Network 180 can be any type of electronic network, such as a local area network, a wide-area network, a virtual private network, the Internet, an intranet, an extranet, a public switched telephone network, an infrared network, a wireless network, and any combination thereof. Network 180 can support communications using any of a variety of commercially-available protocols, such as TCP/IP, UDP, OSI, FTP, UPnP, NFS, CIFS, AppleTalk, and the like. Network 180 can be, for example, a local area network, a wide-area network, a virtual private network, the Internet, an intranet, an extranet, a public switched telephone network, an infrared network, a wireless network, and any combination thereof.

Computer device 105 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 105 as described above need not be enclosed within a single enclosure or even located in close proximity to one another. Those skilled in the art will appreciate that the above-described componentry are examples only, as computer device 105 can include any type of hardware componentry, including any necessary accompanying firmware or software, for performing the disclosed implementations. Computer device 105 can also be implemented in part or in whole by electronic circuit components or processors, such as application-specific integrated circuits (ASICs) or field-programmable gate arrays (FPGAs).

The computer device 105, using the WiFi antenna and the exploration module 140, is configured to detect the presence of one or more WiFi access points, such as static access point 110 and mobile access point associated with a Wi-Fi-based sUAS 115. The exploration module 140 includes a packet analyzer 145 (i.e., Wireshark, which is a free and open source packet analyzer), one or more classifier(s) 150, and optionally a whitelist 155. For every access point that is detected by the exploration module 140, the packet analyzer 145 extracts one or more key features from the OSI Layer 2 characteristics of the WiFi access point, either static access point 110 or sUAS 115. For example, the one or more key features that are extracted can include, but are not limited to, a frame data, an IEEE 802.11 probe response data, and an IEEE 802.11 wireless LAN management frame data. For example, known classifiers that can be used as the one or more classifier(s) 150 can include, but are not limited to, random forests (aka random decision forests) and support vector machines (SVMs). The random forests are an ensemble learning method for classification, regression, and other tasks, that operate by constructing a multiple of decision trees at training time and outputting the class that is the mode of the classes (classification) or mean prediction (regression) of the individual trees. SVMs (aka support vector networks) are supervised learning models with associated learning algorithms that analyze data used for classification and regression analysis.

In one example of a popular sUAS, key features of a Parrot Bebop sUAS, which is manufactured by Parrot S. A., can include the following:
Frame
  Interface id: 0 (wlan0)
IEEE 802.11 Probe Response, Flags
  Frame Control Field: 0x5008
IEEE 802.11 wireless LAN management frame
  Fixed parameters
  Capabilities Information: 0x0501
  Tagged parameters
  Tag: SSID parameter set: Bebop2-403537
  Tag: Supported Rates 6(B), [Mbit/sec]
  Tag: Power Constraint: 0
  Tag: TPC Report Transmit Power: 19, Link Margin: 0
  ERP Information
    Tag Number: ERP Information (42)
    ERP Information: 0x00
  ERP Information
    Tag Number: ERP Information (47)
    ERP Information: 0x00
  Tag: HT Capabilities (802.11n D1.10)
    HT Capabilities Info: 0x198d
    A-MPDU Parameters: 0x1e
  Tag: HT Information (802.11n D1.10)
    HT Information Subset (1 of 3): 0x08
    HT Information Subset (2 of 3): 0x0000
    HT Information Subset (3 of 3): 0x0000
  Tag: Extended Capabilities (8 octets)
    Extended Capabilities: 0x04 (octet 1)
  Tag: Vendor Specific: ParrotSa
  Tag: Vendor Specific: Broadcom Another popular sUAS is the 3DR Solo, the key features of which include, but are not limited to, the following:
IEEE 802.11 Probe Response, Flags:
  Frame Control Field: 0x5000
IEEE 802.11 wireless LAN management frame
  Fixed parameters
  Capabilities Information: 0x0411
  Tagged parameters
  Tag: SSID parameter set: SoloLink_400BFC
  Tag: Supported Rates 1(B), 2(B), 5.5(B), 11(B), 6, 9, 12, 18, [Mbit/sec]
  ERP Information: 0x04
    Tag Number: ERP Information (42)
    ERP Information: 0x04
  Tag: Extended Supported Rates 24, 36, 48, 54, [Mbit/sec]
  Tag: RSN Information
  Tag: HT Capabilities (802.11n D1.10)
    HT Capabilities Info: 0x01ad
    A-MPDU Parameters: 0x1b
  Tag: HT Information (802.11n D1.10)
    HT Information Subset (1 of 3): 0x00
    HT Information Subset (2 of 3): 0x0004
    HT Information Subset (3 of 3): 0x0000
  Tag: Extended Capabilities (8 octets)
    Tag: Vendor Specific: Microsof: WPS At least a subset of the key features that are extracted are used with one or more pre-trained statistical and machine learning classifiers 150 to determine a vendor of the access point, either the access point 110 or the access point associated with the sUAS 115. In one example, the one or more classifiers 150 can be trained to identify static access point 110 and mobile access point associated with a Wi-Fi-based sUAS 115 and perform all decision making tasks. In another example, the one or more classifiers 150 can communicate with an optional whitelist 155 that can list one or more known access points. If the whitelist 155 is used, the packet analyzer 145 can log meta-data captured by the access points to document the time and date at which the whitelisted access point was detected. If the packet analyzer 145 cannot determine the vendor of the access point, e.g., either the access point is not listed in the whitelist 155, if used, or is otherwise undetermined, the packet analyzer 145 can designate the access points as an unknown vendor type.

The detected access point that are designated as an unknown vender type are passed along to a halt module 160 from the exploration module 140. The halt module 160 is used to send pre-packaged non-intrusive exploits 165 to the access point identified by the exploration module 140 to prevent a sUAS controller from advancing the sUAS further toward a protected area 185. For every target sUAS passed along to the halt module 160 by the exploration module 140, the halt module 160 uses the vendor type to select a specific or general pre-packaged exploit (depending on vendor type) necessary to disconnect the user from his/her sUAS. For unknown vendor types, the halt module 160 can cycle through its repository of pre-packaged exploits and continuously launches them until it determines that the target sUAS has been disconnected from its controller. The halt module 160 can then pass all pertinent information regarding the target sUAS along to an attack module 170, especially if it is not able to halt the sUAS.

The attack module 170 can send intrusive exploits 175 to the sUAS identified by the halt module 160 to remove the target sUAS from the airspace 190. The attack module 170 is controlled by a human user. Once engaged, the attack module 170 allows the human user to cycles through its repository of pre-packaged exploits and continuously launch them until the human user determines that the target sUAS has been removed from the airspace.

The process by which some networked devices identify and connect to nearby nodes, particularly in an ad-hoc configuration, is known as a discovery protocol. Not all sUAS have discovery protocols, but for those that do, discovery protocols vary in implementation and details of operation, but their purpose remains the same: to identify and permit the connection of a wireless device to an existing network. The Parrot Bebop sUAS uses a discovery method known as ARDiscovery to negotiate the establishment of a connection between an aircraft running the AR.UAV 2.0+ software and a controller. The discovery protocol is limited to devices connected to its open Wi-Fi access point, and works over a combination of TCP and UDP ports, ultimately establishing a handshake between the controller and the UAV. For the Parrot Bebop I, in the discovery process, the controller initiates a TCP handshake from UAV-to-controller (d2c) and controller-to-UAV (c2d) in order to establish the necessary communication channels for a successful flight. Data sent between the connected devices is managed through JSON records sent via UDP. Once powered up, a FreeFlight mobile application begins the ARDiscovery process, which is required in order to find and negotiate communications between an aircraft and its controller.

The Discovery Port shared by the controller and the UAV is specified in the ARDiscovery protocol as port 44444. For example, the controller would send the JSON record in Table 1 to port 44444 on the UAV and the UAV would respond with the JSON record in Table 2 if it does not already have a controller, otherwise it would respond with the JSON record in Table 3. Note, these JSON records give meta-data about the controller or communication channel between the UAV and the controller.

TABLE 1

Controller-to-UAV JSON record
<From the controller to the UAV>

{"d2c_port":54321,"controller_name":"HTC One M9","controller_type":"htc_himaulatt","device_id":"PI040338AA5B037455"}

TABLE 2

UAV to-controller JSON record, controller accepted
<From the UAV to the controller>

{ "status": 0, "c2d_port": 54321, "arstream_fragment_size": 65000,"arstream_fragment_maximum_number":4,"arstream_max_ack_interval":-1,"c2d_update_port": 51, "c2d_user_port": 21 }

TABLE 3

UAV-to-controller JSON record, controller rejected
<From the UAV to the controller>

{ "status": -3999, "c2d_port": 0, "arstream_fragment_size": 0, "arstream_fragment_maximum_number": 0, "arstream_max_ack_interval": -1, "c2d_update_port": 51, "c2d_user_port": 21 }

For example, examples of the non-intrusive exploit and intrusive exploit include, but are not limited to, a denial-of-service (DoS) attack, a buffer-overflow attack, and an address resolution protocol (ARP) cache poisoning attack. These three security attacks are capable of disrupting the inflight behavior of the Bebop UAV by attacking the communication between the controller and the UAV. The exploits can: (1) look for open ports in the UAV's embedded system using NMAP, (2) capture the network traffic from the packet analyzer 145 of the computer device 105, (3) analyze the captured network traffic to develop an initial fuzzing strategy, and (4) fuzz the controller-to-UAV inter-networking.

For the Bebop UAV, a controller application executing on a smartphone performs an ARP lookup for the MAC address of the device with the IP address of 192.168.42.1. Then, the smartphone sends a JSON record to IP address 192.168.42.1 on port 44444 on the UAV, as shown in Table 1, which contains meta-data about the smartphone and setup parameters. Next, the UAV responds with a JSON record either pointing the controller to port 54321, as shown in Table 2, or denying its request to become a controller with a different JSON record, as shown in Table 3.

For the buffer overflow attack, the halt module 160 and/or the attack module 170 launches a program, e.g., a script, on the computer device 105 that initiates a JSON record to be send via WiFi antenna 125 with up to 1000 characters in the first field, i.e., port, requesting to become the controller for the UAV using the command: telnet 192.168.42.1 44444 {Small to Very Large JSON Record. Through experiments conducted by the inventors, a JSON record with less can 1000 characters in the first field can be categorized as a non-intrusive exploit. A JSON record with around 1000 characters or more in the first field was found to cause the UAV to crash, which can be categorized as an intrusive exploit.

For the denial of service (DoS) attack, the halt module 160 and/or the attack module 170 launches a program, e.g., a script, on the computer device 105 that initiates up to 1000 JSON records to be send via WiFi antenna 125 in parallel requesting to become the controller for the UAV using the command: telnet 192.168.42.1 44444 {Small Replayed JSON Record} &.

For the ARP cache poison attack, the halt module 160 and/or the attack module 170 launches a python library called Scapy in a script on the computer device 105 to continuously send spoofed ARP replies to trick devices on the UAV's wireless network that the MAC address of the computer device 105 was at IP address 192.168.42.1.

Figure 2:
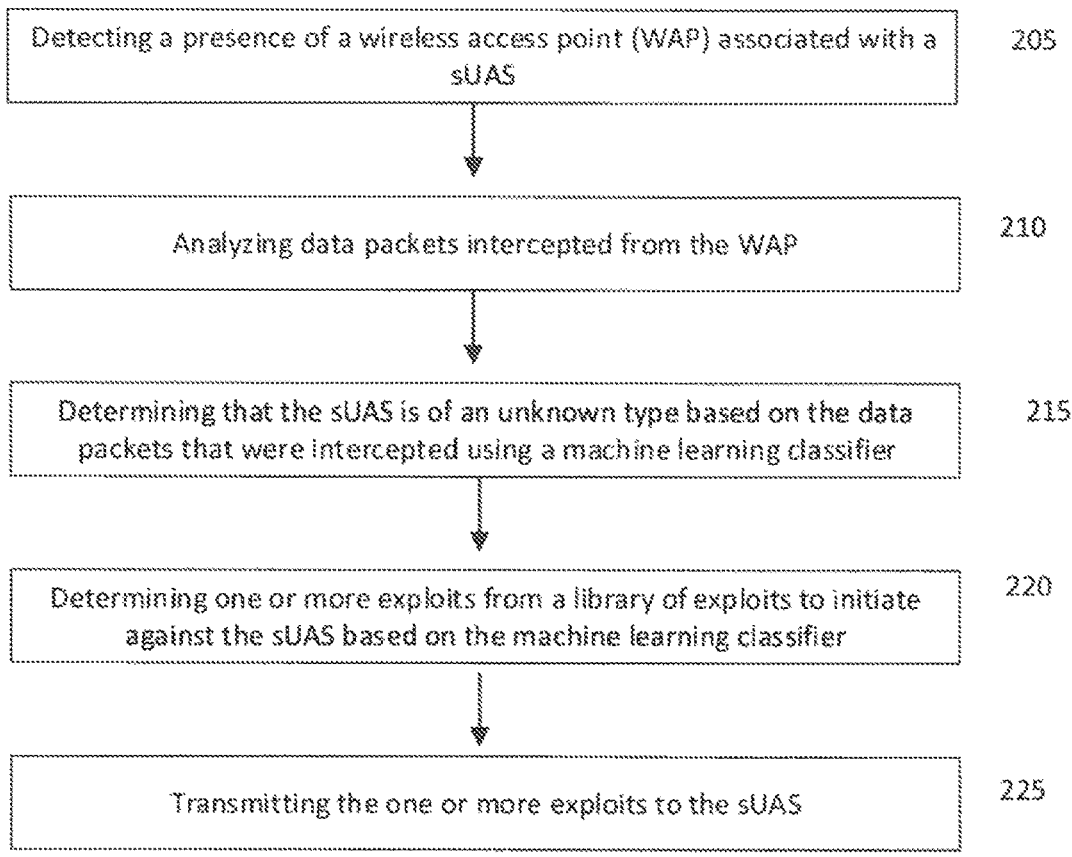
FIG. 2 show a method for searching and interacting with a sUAS 200, according to examples of the present disclosure.

FIG. 2 shows a method for taking control of a small unmanned aerial system (sUAS) 200, according to examples of the present disclosure. At 205, the method begins by detecting a presence of a wireless access point (WAP) associated with a sUAS. For example, the computer device 105, using the WiFi antenna 125 and the exploration module 140 can detect the presence of access point 110 and the access point associated with the sUAS 115. At 210, the method continues by analyzing data packets intercepted from the WAP. Continuing with the example, the packet analyzer 145 of the exploration module 140 can inspect the data packets for one or more key features, which can be further analyzed with one or more pre-trained classifiers 150. The data packets can be inspected by extracting one or more features from the data packets including, but are not limited to, a frame data, an IEEE 802.11 probe response data, and an IEEE 802.11 wireless LAN management frame data. The machine learning classifier 150 can be a random forest tree or a support vector machine. At 215, the method continues by determining that the sUAS is of an unknown type based on the data packets that were intercepted using a machine learning classifier 150. Still continuing with the example, the one or more pre-trained classifiers 150 can optionally use a whitelist, such as whitelist 155, of known access points from which the sUAS 115 can be compared against. At 220, the method continues by determining one or more exploits from a library of exploits to initiate against the sUAS based on the machine learning classifier 150. At 225, the method ends by transmitting the one or more exploits to the sUAS. The one or more exploits can be configured to interrupt communication between the sUAS and a controller of the sUAS and/or configured to cause the sUAS to crash. If the one or more exploits is an intrusive exploit, the method can include receiving a command from a user to initiate the intrusive exploit. The one or more exploits can include a denial-of-service attack, a buffer-overflow attack, and an address resolution protocol (ARP) cache poisoning attack.

If above-described system is implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A computer-implemented method for taking control of a small unmanned aerial system (sUAS), the method comprising:

detecting a presence of a wireless access point (WAP) associated with a sUAS;
capturing and logging metadata to document a time and a date at which a whitelisted access point is detected;
analyzing, by a hardware processor, data packets intercepted from the WAP; determining, by the hardware processor, that the sUAS is of an unknown type based on one or more open systems interconnection (OSI) Layer 2 characteristics of the data packets that were intercepted using a machine learning classifier;
determining, by the hardware processor, one or more exploits from a library of exploits to initiate against the sUAS based on the machine learning classifier; and
transmitting the one or more exploits to the sUAS.

2. The computer-implemented method of claim 1, wherein the machine learning classifier is random forest tree or a support vector machine.

3. The computer-implemented method of claim 1, wherein an exploit from the one or more exploits is configured to interrupt communication between the sUAS and a controller of the sUAS.

4. The computer-implemented method of claim 1, wherein an exploit from the one or more exploits is configured to cause the sUAS to crash.

5. The computer-implemented method of claim 1, wherein the one or more exploits are group as a non-intrusive exploit or an intrusive exploit.

6. The computer-implemented method of claim 5, wherein the one or more exploits is the intrusive exploit further comprises receiving a command from a user to initiate the intrusive exploit.

7. The computer-implemented method of claim 1, wherein the one or more exploits comprise a denial-of-service attack, a buffer-overflow attack, and an address resolution protocol (ARP) cache poisoning attack.

8. The computer-implemented method of claim 1, wherein the data packets that are analyzed and are intercepted from the WAP, further comprises extracting features from the data packets comprising a frame data, an IEEE 802.11 probe response data, and an IEEE 802.11 wireless LAN management frame data.

9. The computer-implemented method of claim 1, wherein the determining that the sUAS is of an unknown type is based on a whitelist of known sUAS types.

10. The computer-implemented method of claim 1, wherein the analyzing packets intercepted from the WAP comprises determining a vendor of the WAP.

11. A computer device comprising:
a hardware processor;
a computer-readable medium configured to store instructions that when executed by the hardware processor cause the hardware processor to perform a method for taking control of a small unmanned aerial system (sUAS), the method comprising:
detecting a presence of a wireless access point (WAP) associated with a sUAS;
capturing and logging metadata to document a time and a date at which a whitelisted access point is detected;
analyzing data packets intercepted from the WAP;
determining that the sUAS is of an unknown type based on one or more open systems interconnection (OSI) Layer 2 characteristics of the data packets that were intercepted using a machine learning classifier;
determining one or more exploits from a library of exploits to initiate against the sUAS based on the machine learning classifier; and
transmitting the one or more exploits to the sUAS.

12. The computer device of claim 11, wherein the machine learning classifier is random forest tree or a support vector machine.

13. The computer device of claim 11, wherein an exploit from the one or more exploits is configured to interrupt communication between the sUAS and a controller of the sUAS.

14. The computer device of claim 11, wherein an exploit from the one or more exploits is configured to cause the sUAS to crash.

15. The computer device of claim 11, wherein the one or more exploits are grouped as a non-intrusive exploit or an intrusive exploit.

16. The computer device of claim 15, wherein the one or more exploits is the intrusive exploit further comprises receiving a command from a user to initiate the intrusive exploit.

17. The computer device of claim 11, wherein the one or more exploits comprise a denial-of-service attack, a buffer-overflow attack, and an address resolution protocol (ARP) cache poisoning attack.

18. The computer device of claim 11, wherein the analyzing data packets intercepted from the WAP, further comprises extracting features from the data packets comprising a frame data, an IEEE 802.11 probe response data, and an IEEE 802.11 wireless LAN management frame data.

19. The computer device of claim 11, wherein the determining that the sUAS is of an unknown type is based on a whitelist of known sUAS types.

* * * * *